United States Patent
Lee et al.

(10) Patent No.: US 11,964,529 B2
(45) Date of Patent: Apr. 23, 2024

(54) APPARATUS AND METHOD FOR CONTROLLING VEHICLE SUSPENSION

(71) Applicants: Hyundai Motor Company, Seoul (KR); Kia Motors Corporation, Seoul (KR)

(72) Inventors: Jin Hee Lee, Pyeongtaek-si (KR); Baek Hee Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 665 days.

(21) Appl. No.: 17/166,832

(22) Filed: Feb. 3, 2021

(65) Prior Publication Data
US 2022/0032711 A1 Feb. 3, 2022

(30) Foreign Application Priority Data
Jul. 30, 2020 (KR) .......................... 10-2020-0095340

(51) Int. Cl.
*B60G 17/018* (2006.01)
*B60G 17/0165* (2006.01)
(Continued)

(52) U.S. Cl.
CPC ..... *B60G 17/0182* (2013.01); *B60G 17/0165* (2013.01); *B60G 17/01908* (2013.01);
(Continued)

(58) Field of Classification Search
CPC ............ B60G 17/0165; B60G 17/0182; B60G 17/01908; B60G 17/06; B60G 17/08;
(Continued)

(56) References Cited

U.S. PATENT DOCUMENTS 5,467,280 A * 11/1995 Kimura .................. B60G 17/08
280/5.515
5,550,739 A * 8/1996 Hoffmann ............ B60G 17/018
701/37
(Continued)

FOREIGN PATENT DOCUMENTS

CN 103072440 A * 5/2013
DE 10 2008 055 905 A 5/2010
(Continued)

*Primary Examiner* — John M Zaleskas
(74) *Attorney, Agent, or Firm* — MORGAN, LEWIS & BOCKIUS LLP

(57) ABSTRACT

An apparatus and a method for controlling vehicle suspension, which controls a variable damper in consideration of virtual tire damping, may include a variable damper which is installed between a vehicle body and a wheel, a first acceleration sensor which is installed at each corner of the vehicle body to measure a vehicle body corner vertical acceleration, a second acceleration sensor which is installed to each wheel to measure a wheel vertical acceleration, and a controller that estimates a road surface roughness based on the vehicle body corner vertical acceleration and the wheel vertical acceleration, determines a virtual tire damping required damping force based on the estimated road surface roughness, and adjusts a damping force of the variable damper based on the determined virtual tire damping required damping force.

18 Claims, 5 Drawing Sheets

(51) Int. Cl.
*B60G 17/019* (2006.01)
*B60G 17/08* (2006.01)

(52) U.S. Cl.
CPC .......... *B60G 17/08* (2013.01); *B60G 2204/62* (2013.01); *B60G 2400/0521* (2013.01); *B60G 2400/0522* (2013.01); *B60G 2400/102* (2013.01); *B60G 2400/204* (2013.01); *B60G 2400/821* (2013.01); *B60G 2500/104* (2013.01); *B60G 2500/11* (2013.01); *B60G 2600/16* (2013.01); *B60G 2600/182* (2013.01); *B60G 2600/1871* (2013.01); *B60G 2600/1877* (2013.01); *B60G 2600/26* (2013.01); *B60G 2600/60* (2013.01); *B60G 2600/73* (2013.01); *B60G 2800/01* (2013.01); *B60G 2800/162* (2013.01); *B60G 2800/912* (2013.01); *B60G 2800/916* (2013.01)

(58) Field of Classification Search
CPC ............ B60G 2200/10; B60G 2204/62; B60G 2400/0521; B60G 2400/0522; B60G 2400/102; B60G 2400/204; B60G 2400/82; B60G 2400/821; B60G 2500/104; B60G 2500/11; B60G 2600/16; B60G 2600/182; B60G 2600/1871; B60G 2600/1877; B60G 2600/26; B60G 2600/60; B60G 2600/73; B60G 2800/01; B60G 2800/162; B60G 2800/164; B60G 2800/912; B60W 10/22; B60W 40/06; B60W 2050/0052
See application file for complete search history.

(56) References Cited

U.S. PATENT DOCUMENTS

| | | | | |
|---|---|---|---|---|
| 5,810,384 A * | 9/1998 | Iwasaki | ................ | B60G 17/018 280/5.514 |
| 2002/0183907 A1* | 12/2002 | Stiller | .................... | B60G 17/08 701/37 |
| 2004/0094912 A1* | 5/2004 | Niwa | ................ | B60G 17/0165 280/5.518 |
| 2005/0113997 A1* | 5/2005 | Kim | .................. | B60G 17/0165 280/5.515 |
| 2005/0178628 A1* | 8/2005 | Uchino | ................ | B60G 17/016 188/379 |
| 2005/0241366 A1* | 11/2005 | Sonnenburg | .......... | G01M 17/04 73/11.04 |
| 2009/0043452 A1* | 2/2009 | Sekiya | .................... | F16F 9/535 701/40 |
| 2011/0025000 A1* | 2/2011 | Inoue | .................... | B60G 17/06 280/5.507 |
| 2011/0127127 A1* | 6/2011 | Hirao | .................... | B60G 17/08 188/266.2 |
| 2011/0241299 A1* | 10/2011 | Harada | .................. | B60G 17/08 280/5.513 |
| 2011/0245995 A1* | 10/2011 | Schwarz | .............. | G06V 20/588 382/104 |
| 2013/0166149 A1* | 6/2013 | Liu | ...................... | B60G 17/015 701/37 |
| 2014/0005889 A1* | 1/2014 | Hayakawa | ....... | B60G 17/01933 701/37 |
| 2014/0358373 A1* | 12/2014 | Kikuchi | ............. | B60G 17/0185 701/38 |
| 2016/0288608 A1* | 10/2016 | Göhrle | ................. | B60G 17/018 |
| 2018/0105206 A1* | 4/2018 | Gullven | ................ | B60W 40/06 |
| 2019/0283733 A1* | 9/2019 | Takei | .................. | B60G 17/0195 |
| 2020/0270824 A1* | 8/2020 | Nagayama | ............... | E01C 23/01 |
| 2021/0031585 A1* | 2/2021 | Toyohira | ............ | B60G 17/0165 |
| 2021/0162832 A1* | 6/2021 | Hwang | .................. | B60G 17/06 |
| 2021/0339594 A1* | 11/2021 | Wang | ..................... | B60G 13/14 |
| 2021/0379954 A1* | 12/2021 | Bremmer | .......... | B60G 17/0165 |
| 2021/0402841 A1* | 12/2021 | Furuta | .................... | B60G 17/08 |
| 2022/0032709 A1* | 2/2022 | Lee | .................... | B60G 17/0165 |
| 2022/0176766 A1* | 6/2022 | Kikuchi | ................. | B60G 17/08 |
| 2023/0249510 A1* | 8/2023 | Kawasaki | ........ | B60G 17/01908 701/37 |

FOREIGN PATENT DOCUMENTS

| | | | | |
|---|---|---|---|---|
| DE | 102008055905 A1 | * | 5/2010 | ........ B60G 17/0165 |
| DE | 10 2009 033 219 A | | 7/2010 | |
| DE | 10 2013 018 927 B | | 1/2020 | |
| DE | 10 2008 052 993 B | | 9/2022 | |
| JP | H08310214 A | * | 11/1996 | |
| JP | 2595238 B2 | * | 4/1997 | |
| JP | H1194661 A | * | 4/1999 | |
| JP | 2005075238 A | * | 3/2005 | |
| JP | 2008126786 A | * | 6/2008 | |
| JP | 2008155761 A | * | 7/2008 | ............ B60G 15/10 |
| JP | 2008222023 A | * | 9/2008 | |
| JP | 2009143472 A | * | 7/2009 | |
| JP | 2011068235 A | * | 4/2011 | |
| JP | 2011098688 A | * | 5/2011 | |
| KR | 20060104149 A | * | 3/2005 | |
| KR | 10-2010-0045780 A | | 5/2010 | |
| KR | 20100045780 A | * | 5/2010 | |
| KR | 101786323 B1 | * | 10/2017 | |
| KR | 20180082674 A | * | 7/2018 | |

* cited by examiner

APPARATUS AND METHOD FOR CONTROLLING VEHICLE SUSPENSION

CROSS-REFERENCE TO RELATED APPLICATION

The present application claims priority to Korean Patent Application No. 10-2020-0095340, filed on Jul. 30, 2020, the entire contents of which is incorporated herein for all purposes by this reference.

BACKGROUND OF THE INVENTION

Field of the Invention

The present invention relates to an apparatus and a method for controlling vehicle suspension, which controls a variable damper in consideration of virtual tire damping.

Description of Related Art

A vehicle is provided with a suspension that absorbs an impact between a vehicle body and a wheel (axle) and maintains the road surface contact of a tire. Suspension (system) includes an arm or link that controls the movement of a wheel, a spring that absorbs and regulates a shock, and a damper, also called as a shock absorber. Because the spring and damper operate only within a physically defined specific range and move passively between the vehicle body and the wheels, the spring and damper affect the ride comfort, handling and/or steering response of the vehicle. Accordingly, techniques for adjusting the characteristics of suspension (e.g., spring characteristics, damper characteristics, and the like) have been studied in order to provide an optimal ride comfort, handling and/or steering response to a vehicle driver.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling vehicle suspension, which can control a variable damper in consideration of virtual tire damping in order to minimize a relative speed between a wheel and a road surface.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus of controlling vehicle suspension includes a variable damper which is installed between a vehicle body and a wheel, a first acceleration sensor which is installed at each corner of the vehicle body to measure a vehicle body corner vertical acceleration, a second acceleration sensor which is installed to each wheel to measure a wheel vertical acceleration, and a controller that estimates a road surface roughness based on the vehicle body corner vertical acceleration and the wheel vertical acceleration, determines a virtual tire damping required damping force based on the estimated road surface roughness, and adjusts a damping force of the variable damper based on the determined virtual tire damping required damping force.

The controller may remove noise from measured signals output from the first acceleration sensor and the second acceleration sensor through filtering the measured signals and obtain a vehicle body corner vertical speed and a wheel vertical speed through integration.

The controller may estimate the road surface roughness by use of a Kalman filter.

The controller may be configured to determine a skyhook control gain, a virtual tire damping control gain and a passive required damping force based on the road surface roughness and vehicle driving information obtained through a controller area network (CAN).

The controller may be configured to determine a vertical speed, a pitch angular speed and a roll angular speed of a vehicle body gravity center based on the vehicle body corner vertical speed and the wheel vertical speed, determine a skyhook control required force and a moment based on the vertical speed, the pitch angular speed and the roll angular speed of the vehicle body gravity center, and allocate a required damping force for each vehicle body corner based on the skyhook control required force and the moment.

The controller may be configured to determine the virtual tire damping required damping force by use of the road surface roughness and the virtual tire damping control gain.

The controller may be configured to determine a final required damping force of each corner by integrating the required damping force of each vehicle body corner, the virtual tire damping required damping force and the passive required damping force.

The controller may be configured to determine a current to be applied to the variable damper based on the final required damping force of each corner.

The controller may be configured to control the damping force of the variable damper by adjusting a current signal applied to a solenoid valve of the variable damper.

According to various aspects of the present invention, a method of controlling vehicle suspension includes measuring a vehicle body corner vertical acceleration and a wheel vertical acceleration through first and second acceleration sensors that are installed on a vehicle body and a wheel, respectively, estimating a road surface roughness based on the vehicle body corner vertical acceleration and the wheel vertical acceleration, determining a virtual tire damping required damping force based on the road surface roughness, and adjusting a damping force of a variable damper based on the virtual tire damping required damping force.

The measuring may include removing noise from measured signals output from the first acceleration sensor and the second acceleration sensor through filtering and obtaining a vehicle body corner vertical speed and a wheel vertical speed through integration.

The estimating of the road surface roughness may include obtaining vehicle driving information through a controller area network (CAN), and determining a skyhook control gain, a virtual tire damping control gain and a passive required damping force based on the vehicle driving information and the road surface roughness.

The method may further include determining a vertical speed, a pitch angular speed and a roll angular speed of a vehicle body gravity center based on the vehicle body corner vertical speed and the wheel vertical speed, determining a skyhook control required force and a moment based on the vertical speed, the pitch angular speed and the roll angular speed of the vehicle body gravity center and the skyhook control gain, and allocating a required damping force of each vehicle body corner based on the skyhook control required force and the moment.

The determining of the virtual tire damping required damping force may include determining the virtual tire damping required damping force by use of the road surface roughness and the virtual tire damping control gain.

The adjusting of the damping force of the variable damper may include determining a final required damping force of each corner by integrating the required damping force of each vehicle body corner, the virtual tire damping required damping force and the passive required damping force.

The adjusting of the damping force of the variable damper may include determining a current to be applied to the variable damper based on the final required damping force of each corner.

The adjusting of the damping force of the variable damper may further include controlling the damping force of the variable damper by adjusting a current signal applied to a solenoid valve of the variable damper.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
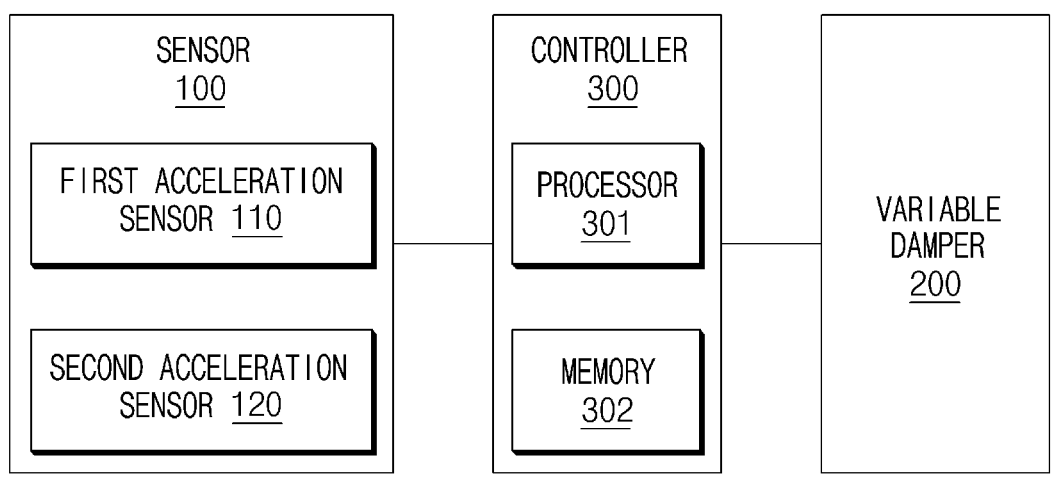
FIG. 1 is a block diagram illustrating an apparatus of controlling vehicle suspension according to exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used in this case, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
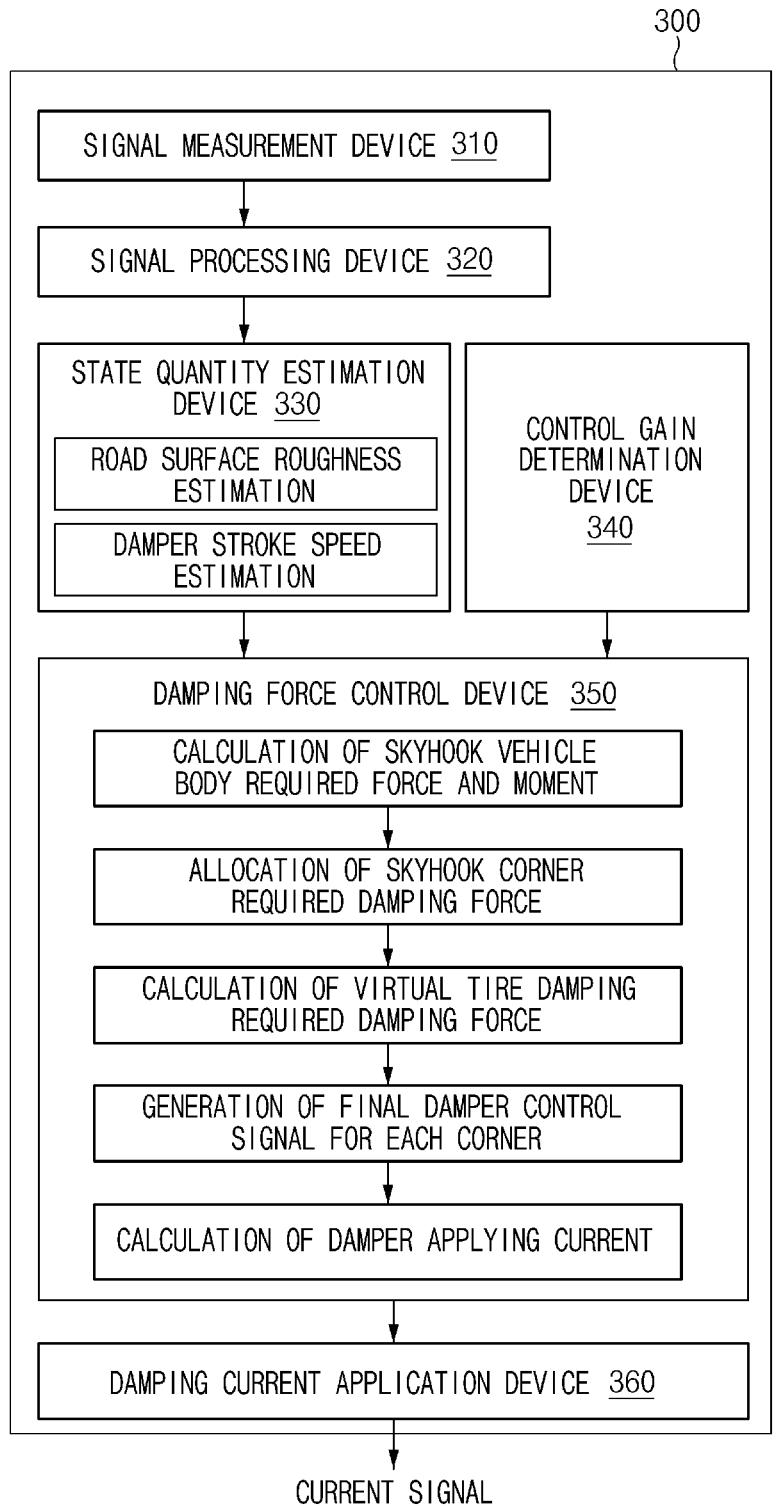
FIG. 2 is a block diagram illustrating a functional configuration of a controller illustrated in FIG. 1.
Figure 3:
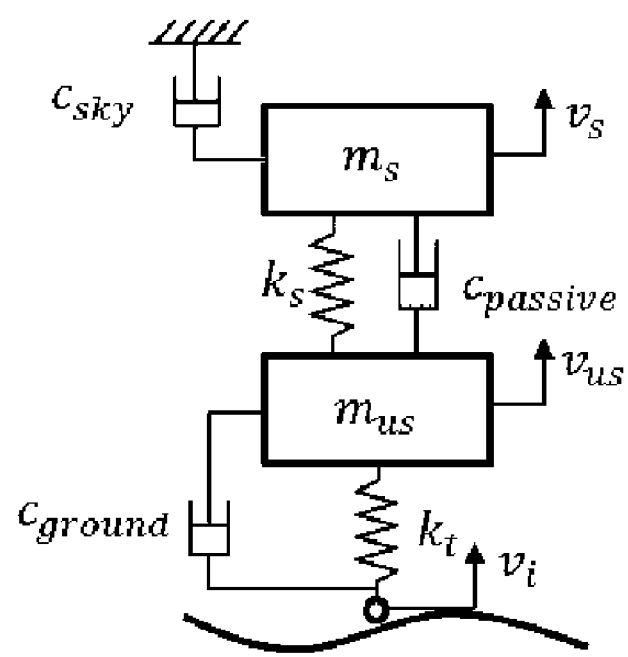
FIG. 3 is a conceptual diagram illustrating a ¼ vehicle model according to exemplary embodiments of the present invention.

FIG. 1 is a block diagram illustrating an apparatus of controlling vehicle suspension according to exemplary embodiments of the present invention. FIG. 2 is a block diagram illustrating a functional configuration of a controller illustrated in FIG. 1. FIG. 3 is a conceptual diagram illustrating a ¼ vehicle model according to exemplary embodiments of the present invention.

Referring to FIG. 1, an apparatus 100 for controlling vehicle suspension includes a sensor 100, a variable damper 200, and a controller 300.

The sensor 100 is mounted on a vehicle body and a wheel to measure a vehicle body corner vertical acceleration and a wheel vertical acceleration. The sensor 100 may include at least three or more first acceleration sensors 110 and at least two or more second acceleration sensors 120. The first acceleration sensors 110 may be attached to the top mount portions of four corners of a vehicle body to measure the vertical accelerations of the corners, respectively. For example, the first acceleration sensors 110 may be mounted at left and right front corners and left and right rear corners of the vehicle body, or may be installed on one point of the left and right front corners and the left and right rear corners, respectively. The second acceleration sensors 120 may be attached to knuckles of wheels to measure the wheel vertical accelerations, respectively. Furthermore, the sensor 100 may further include a wheel speed sensor, a steering angle sensor, a lateral acceleration sensor, and the like.

The variable damper 200 may be mounted between the vehicle body and the wheel (axle) to mitigate shock or vibration transmitted from a road surface to a tire while the vehicle is driven. The variable dampers 200 may be installed between the vehicle body and the left and right front wheels and the left and right rear wheels, respectively. The variable damper 200 may include a solenoid valve for adjusting damping force. The variable damper 200 may adjust the actual damping force by controlling the operation of the solenoid valve. In the instant case, the variable damper 200 using a solenoid valve as an actuator is described as an example thereof, but a stepping motor or the like may be used as an actuator. As the variable damper 200, a continuous damping control (CDC) damper may be used, but the exemplary embodiment is not limited thereto and various variable dampers may be used.

The controller 300, which is an Electronic Control Unit (ECU) of controlling the damping force of the variable damper 200 in the suspension, may control the damping force of the variable damper 200 by use of sky-hook control logic and virtual tire damping control logic. The controller 300 may obtain a vehicle body corner vertical acceleration and a wheel vertical acceleration by use of the sensor 100. In the instant case, the vehicle body corner vertical acceleration may include, as a vertical acceleration of each corner of the vehicle body, a vertical acceleration in the left front corner of the vehicle body, a vertical acceleration in the right front corner, a left rear vertical acceleration, and a right rear vertical acceleration. The vertical acceleration of the wheel may include a vertical acceleration of the front left wheel, a vertical acceleration of the front right wheel, a vertical acceleration of the rear left wheel, and a vertical acceleration of the rear right wheel. The controller 300 may determine a skyhook required damping force and a virtual tire damping required damping force (the required damping force of a virtual tire) based on the vehicle body corner vertical acceleration and the wheel vertical acceleration. The controller 300 may adjust an amount of current applied to the variable damper 200 based on the skyhook required damping force and the virtual tire damping required damping force. The damping force of the variable damper 200 may vary corresponding to the amount of current applied to the variable damper 200.

The controller 300 may include a processor 301 and a memory 302. The processor 301 controls the overall operation of the controller 300. The processor 301 may be implemented with at least one of an application specific integrated circuit (ASIC), a digital signal processor (DSP), a programmable logic device (PLD), field programmable gate arrays (FPGAs), a central processing unit (CPU), a microcontroller, and/or a microprocessor. The memory 302 may be a non-transitory storage medium that stores instructions executed by the processor 301. The memory 302 may be implemented with at least one of a flash memory, a hard disk, a secure digital (SD) card, a random access memory (RAM), a static random access memory (SRAM), and a read only memory (ROM), a programmable read only memory (PROM), an electrically erasable and programmable ROM (EEPROM), an erasable and programmable ROM (EPROM), a storage medium (recording medium), a register, and/or the like.

Hereinafter, a functional configuration of the controller 300 will be described with reference to FIG. 2.

The controller 300 may include a signal measurement device 310, a signal processing device 320, a state quantity estimation device 330, a control gain determination device 340, a damping force control device 350, and a damper current application device 360. In the instant case, each configuration may mean logic that performs a specific function, and each logic may be executed by the processor 301.

The signal measurement device 310 may obtain (receive) signals measured by the first acceleration sensor and the second acceleration sensor 110 and 120. The signal measurement device 310 may measure a vehicle body vertical acceleration of each corner by use of the first acceleration sensor 110. The signal measurement device 310 may measure a wheel vertical acceleration of each wheel by use of the second acceleration sensor 120.

The signal measurement device 310 may obtain vehicle driving information through a controller area network (CAN). The vehicle driving information may include vehicle speed, steering angle, deceleration, acceleration, and/or lateral acceleration. The signal measurement device 310 may obtain the vehicle driving information through other ECUs and/or sensors (e.g., a wheel speed sensor, a steering angle sensor, and/or a lateral acceleration sensor) mounted in the vehicle through CAN communication.

The signal processing device 320 may post-process the signal (information, data) obtained by the signal measurement device 310. The signal processing device 320 may remove noise included in the vehicle body vertical acceleration signal of each corner and the wheel vertical acceleration signal of each wheel measured by the first acceleration sensor and the second acceleration sensor 110 and 120. In other words, the signal processing device 320 may filter noise from measured signals (detecting signals) received from the first acceleration sensor and the second acceleration sensor 110 and 120. Furthermore, the signal processing device 320 may determine a vehicle body vertical speed of each corner and a wheel vertical speed of each wheel by integrating the vehicle body vertical acceleration of each corner and the wheel vertical acceleration of each wheel. The signal processing device 320 may determine vehicle body displacement information of each corner and wheel displacement information of each wheel by integrating the vehicle body vertical speed of each corner and the wheel vertical speed of each wheel.

The state quantity estimation device 330 may estimate the road surface roughness, a damper stroke speed, and the like in real time by use of the vehicle body corner vertical acceleration, the wheel vertical acceleration, and the signal (e.g., the vehicle body corner vertical speed and the wheel vertical speed) post-processed by the signal processing device 320. The state quantity estimation device 330 may estimate the road surface roughness by use of a Kalman filter, a vehicle model, or the like.

The control gain determination device 340 may determine a skyhook control gain, a virtual tire damping control gain, and a passive damping control gain based on the vehicle driving information. That is, the control gain determination device 340 may determine the skyhook control gain, the virtual tire damping control gain, and the passive damping control gain based on the vehicle driving information such as the vehicle speed, the vertical acceleration, the lateral acceleration, the steering angle, the road surface information, and the like.

The damping force control device 350 may determine the vehicle body gravity center (vehicle gravity center), the skyhook required damping force (damping force) of a wheel, and the virtual tire damping required damping force (damping force) based on the information measured by the signal measurement device 310, the information post-processed by the signal processing device 320, the information estimated by the state quantity estimation device 330, and the like. Furthermore, the damping force control device 350 may determine a final damper control force for each corner and a current to be applied to the variable damper 200 to satisfy the required damping force.

The damping force control device 350 may determine the vertical speed, the pitch angular speed, and the roll angular speed of the vehicle body gravity center based on the vehicle body vertical speed of each corner and the vehicle specification information. The vehicle specification information may be stored in the memory 302 and may include a wheelbase, a wheel tread, the distance between the front wheel and the vehicle gravity center, the distance between the rear wheel and the vehicle gravity center, and the like. The memory 302 may store information on the attachment locations (installation locations) of the first acceleration sensor and the second acceleration sensor 110 and 120 in advance.

The damping force control device 350 may determine the skyhook required damping force in each direction based on the three-direction speeds (e.g., the vertical speed, pitch angular speed, and roll angular speed) of the vehicle body gravity center and the skyhook control gain. In detail, the damping force control device 350 may determine the force and moment required for skyhook control based on the three-direction speeds of the vehicle body gravity center and the skyhook control gain determined by the control gain determination device 340. In other words, the damping force control device 350 may determine the skyhook required damping force in each direction proportional to the three-direction speeds of the vehicle body gravity center and the skyhook control gain. The damping force control device 350 may allocate the skyhook required damping force for each vehicle body corner based on the determined required force and moment. The damping force control device 350 may determine the virtual tire damping required damping force for each wheel by use of the estimated road surface roughness and the virtual tire damping control gain.

The damping force control device 350 may integrate the determined skyhook required damping force, the virtual tire damping required damping force, and the passive damping force determined by the control gain determination device 340 to determine the final required damping force for each corner (i.e., damper control force). The damping force control device 350 may determine the damper applied current based on the determined final damping force required for each corner.

The damper current applying device 360 may actually generate a current based on the damper applied current determined by the damping force control device 350 and apply the current to the variable damper 200. The damping force of the variable damper 200 may be changed corresponding to the current applied by the damper current applying device 360. The damper current applying device 360 may control the operation of the solenoid valve by adjusting the amount of current applied to the solenoid valve of the variable damper 200. As the solenoid valve of the variable damper 200 operates, the actual damping force of each corner of the vehicle body may be changed. The damper current applying device 360 may prevent the variable damper 200 from being damaged by limiting the maximum current applied to the solenoid valve of the variable damper 200.

Hereinafter, determining the required damping force of each wheel will be described in detail.

First, the damping force control device 350 may determine the required damping force of each wheel for skyhook control.

In the case of skyhook control, unlike the virtual tire damping control, the amount of control may be determined based on the vehicle body motion. The control gain determination device 340 may determine skyhook vehicle body three-direction (e.g., vertical, pitch and roll) control gains $C_{sky\_heave}$, $C_{sky\_pitch}$ and $C_{sky\_roll}$ based on the vehicle driving information. When the skyhook vehicle body three-direction control gains are determined, the damping force control device 350 may multiply the vehicle body three-direction speeds $v_{heave}$, $w_{pitch}$ and $w_{roll}$ by the vehicle body three-direction control gains $C_{sky\_heave}$, $C_{sky\_pitch}$ and $C_{sky\_roll}$ as in following Equation 1, determining the vehicle body required damping forces $F_{sky\_heave}$, $M_{sky\_pitch}$ and $M_{sky\_roll}$.

$$F_{sky\_heave} = C_{sky\_heave} \cdot v_{heave}$$

$$M_{sky\_pitch} = C_{sky\_pitch} \cdot w_{pitch}$$

$$M_{sky\_roll} = C_{sky\_roll} \cdot w_{roll} \qquad \text{[Equation 1]}$$

When the vehicle body required damping force is determined, the damping force control device 350 may use the vehicle specification information and the sensor mounting location of each vehicle body corner to allocate the required damping force $F_{corner}$ (or $F_{sky\_corner}$) for each corner for achieving the skyhook vehicle body required damping force. The required damping force $F_{corner}$ for each corner may be expressed as following Equation 2.

$$F_{corner} = H^T \cdot F_{modal} \qquad \text{[Equation 2]}$$

where, $$F_{corner} = \begin{bmatrix} F_{fl} \\ F_{fr} \\ F_{rl} \\ F_{rr} \end{bmatrix} F_{modal} = \begin{bmatrix} F_{heave} \\ M_{roll} \\ M_{pitch} \\ M_{warp} \end{bmatrix} H = \begin{bmatrix} 1 & 1 & 1 & 1 \\ t_f & -t_f & t_r & -t_r \\ -a & -a & b & b \\ t_f & -t_f & -t_r & t_r \end{bmatrix},$$

'$F_{fl}$' is the required damping force for the left front corner, '$F_{fr}$' is the required damping force for the right front corner, '$F_{rl}$' is the required damping force for the left rear corner, '$F_{rr}$' is the required damping force for the right rear corner, '$F_{heave}$' is the required damping force for the vertical direction, '$M_{roll}$' is the moment in the roll direction, '$M_{pitch}$' is the moment in the pitch direction, and $M_{warp}$ is the virtual moment ($M_{warp} = \varepsilon \times M_{roll}$). In general, '$\varepsilon$' may be set to '0' (zero). '$t_f$' is the left and right distance from the center of the front wheel shaft to the location where the vehicle body corner acceleration sensor (the first acceleration sensor) is attached, '$t_r$' is the left and right distance from the center of the rear wheel shaft to the location where the vehicle body corner acceleration sensor (the first acceleration sensor) is attached, 'a' is the front and rear distance from the gravity center to the location where the front-wheel-side vehicle body corner acceleration sensor (the first acceleration sensor) is attached, and 'b' is the front and rear distance from the gravity center to the location where the rear-wheel-side vehicle body corner acceleration sensor (the first acceleration sensor) attachment position.

Next, the damping force control device 350 may determine the final required damping force of each wheel. The final required damping force of each wheel may be determined based on the ¼ vehicle model shown in FIG. 3. In FIG. 3, $K_s$ and $K_t$ are a suspension spring coefficient and a tire spring coefficient, $m_s$ and $m_{us}$ are vehicle body mass and wheel mass, and $v_s$, $v_{us}$ and $v_i$ are the vehicle body vertical speed of each corner, the vertical speed of each wheel, and the road surface condition input (the road surface speed of each wheel) of each wheel, and $C_{sky}$, $C_{ground}$ and $C_{passive}$ are the skyhook control gain, the virtual tire damping control gain and the passive damping control gain.

When the required damping force of the virtual tire damping is determined based on the skyhook required damping force for each wheel, the vertical speed for each wheel, and the road surface speed for each wheel, the damping force control device 350 may perform semi-active control. In the semi-active control, the required damping force is activated (ON) when a preset specific condition for each control logic is satisfied, and the required damping force is deactivated (OFF) when the preset specific condition is not satisfied, performing target control.

Referring to Table 1, the skyhook control logic may activate the skyhook required damping force for each wheel when a specific condition is satisfied based on the vehicle body corner vertical speed $v_s$ and each wheel vertical speed $v_{us}$, and when the specific condition is not satisfied, the skyhook required damping force for each wheel may be deactivated. Furthermore, the virtual tire damping control logic may determine whether a specific condition is satisfied based on the vehicle body corner vertical speed $v_s$ of each corner, the vertical speed of each wheel $v_{us}$, and the road surface state input (the road surface speed of each wheel) $v_i$. The virtual tire damping control logic may activate the virtual tire damping required damping force of each wheel when a preset specific condition is satisfied, and deactivate the virtual tire damping required damping force for each wheel when the preset specific condition is not satisfied. To the contrary, the passive damping control logic may be always operated, and may determine the passive damping force based on the passive damping control gain $C_{passive}$, the vehicle body vertical speed of each corner $v_s$ and the vertical speed of each wheel $v_{us}$.

obtain the vehicle driving information through CAN communication. The vehicle driving information may be used to determine each control logic and the damping force gain for vehicle body motion control in each direction thereof.

In S120, the controller 300 may perform post-processing for the vehicle body corner vertical acceleration and the wheel vertical acceleration. The controller 300 may perform filtering to remove noise included in signals received from the first acceleration sensor and the second acceleration sensor 110 and 120. The controller 300 may determine the vehicle body vertical speed of each corner, the vertical speed of each wheel, the vehicle body displacement information of each corner, and the displacement information for each wheel through integration.

In S130, the controller 300 may estimate the road surface roughness in real time by use of the vehicle body corner vertical acceleration, the wheel vertical acceleration, and the post-processed signal (e.g., the vehicle body corner vertical speed and wheel vertical speed). The controller 300 may estimate the road surface roughness by use of the Kalman filter and/or simplified vehicle model information.

In S140, the controller 300 may determine an appropriate skyhook control gain and a virtual tire damping control gain by determining a driving situation such as turning, deceleration or acceleration and a roughness state of the road based on the vehicle driving information and the road surface roughness information. The controller 300 may determine the passive damping control gain (passive damping force) based on the vehicle driving information.

TABLE 1

| Skyhook required damping force for each wheel | Virtual tire damping required damping force for each wheel | Passive damping force |
|---|---|---|
| if $v_s \cdot (v_s - v_{us}) \geq 0$<br>  $F_{sky\_final} = F_{sky\_corner}$<br>else<br>  $F_{sky\_final} = 0$<br>end | if $- (v_{us} - v_i) \cdot (v_s - v_{us}) \geq 0$<br>  $F_{ground} = c_{ground} \cdot (v_{us} - v_i)$<br>else<br>  $F_{ground} = 0$<br>end | $F_{passive} = c_{passive} \cdot (v_s - v_{us})$ |

In the instant case, the virtual tire damping control gain $C_{ground}$ and the passive damping control gain $C_{passive}$ may be determined based on the vehicle driving information.

The damping force control device 350 may determine the final required damping force of each corner (wheel) by adding the skyhook required damping force $F_{sky\_final}$, the virtual tire damping required damping force $F_{ground}$ and the passive required damping force $F_{passive}$. In other words, the final required damping force for each corner may be expressed as following Equation 3.

$$F_{final} = F_{sky\_final} + F_{ground} + F_{passive} \quad \text{[Equation 3]}$$

Figure 4:
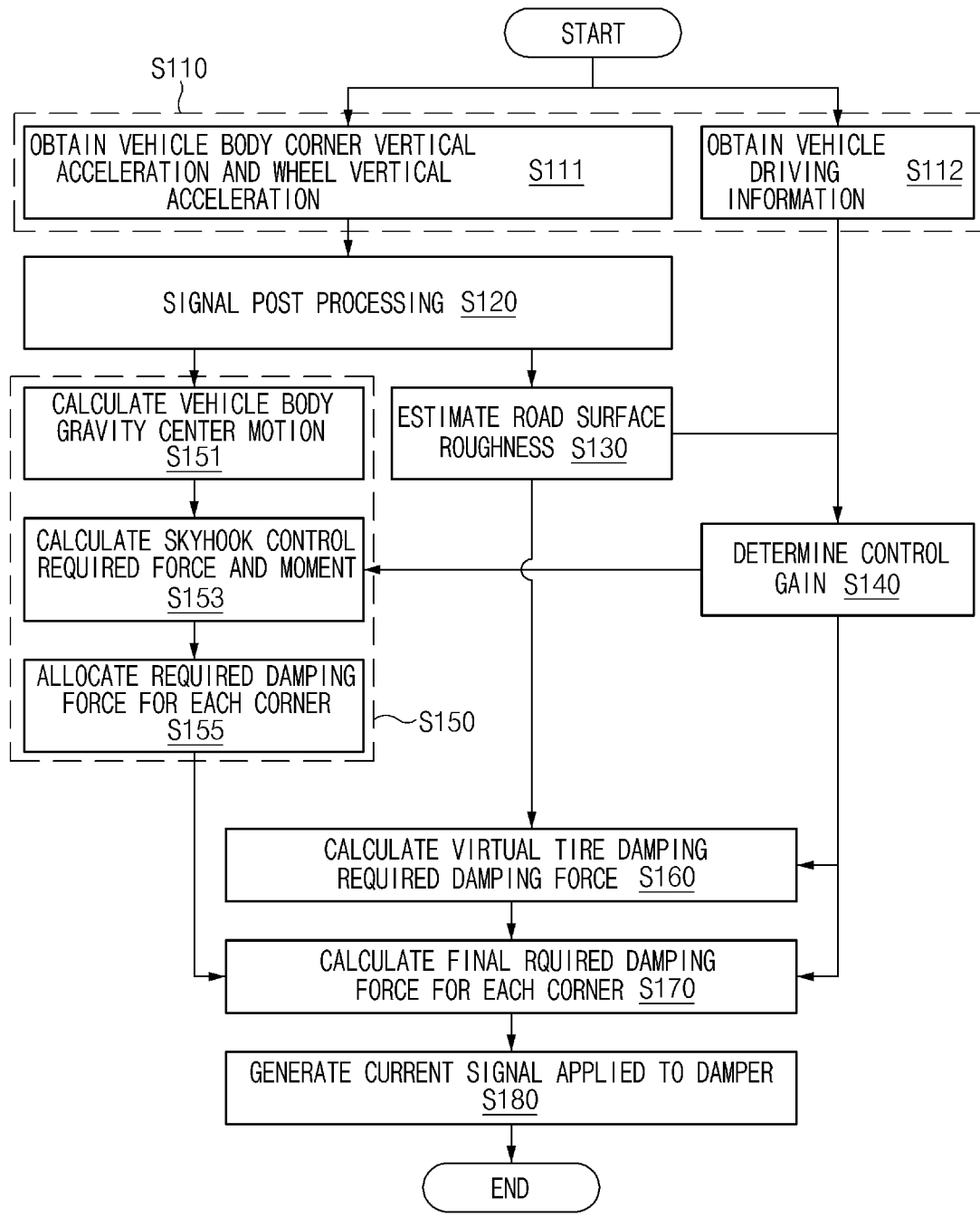
FIG. 4 is a flowchart illustrating a method of controlling vehicle suspension according to exemplary embodiments of the present invention.

FIG. 4 is a flowchart illustrating a method of controlling vehicle suspension according to exemplary embodiments of the present invention.

In S110, the controller 300 may obtain the vehicle body vertical acceleration of each corner, the wheel vertical acceleration, and the vehicle driving information. In S111, the controller 300 may obtain the vehicle body vertical acceleration for each corner through the first acceleration sensor 110 and may obtain the vertical acceleration for each wheel through the second acceleration sensor 120. The vehicle body vertical acceleration of each corner (vehicle body corner vertical acceleration) and the vertical acceleration of each wheel (wheel vertical acceleration) may be used directly for damping force control. The controller 300 may In S150, the controller 300 determines the skyhook required damping force for each vehicle body corner based on the post-processed signal and the skyhook control gain. In detail, the controller 300 may determine the vehicle body gravity center motion (three-direction speeds of the vehicle body gravity center) by use of the vehicle body corner vertical speed and the vehicle specification information in S151. The vehicle specification information may include a wheel base, a wheel tread, a distance between the front wheel and the body gravity center (vehicle gravity center), a distance between the rear wheel and the vehicle body gravity center, and the like. The controller 300 may determine the vertical speed, the pitch angular speed, and the roll angular speed of the center of gravity of the vehicle based on the vehicle body vertical speed of each corner and the vehicle specification information. In S153, the controller 300 may determine the skyhook control required force and moment based on the three-direction speeds of the vehicle gravity center determined in S151 and the skyhook control gain determined in S140. The controller 300 may determine a skyhook required damping force in proportion to the vertical speed, pitch angular speed, and roll angular speed of the vehicle gravity center determined in S151 and the skyhook control gain determined in S140. In S155, the controller 300 may allocate a required damping force for each corner configured for satisfying the force and moment required to attenuate the three-direction speeds of the vehicle gravity center by use of the conversion formula used in S151. The controller 300 may allocate the vehicle body required damping force (damping force) for each corner based on the determined skyhook control required force and moment.

In S160, the controller 300 may determine the virtual tire damping required damping force for each wheel by use of the road surface roughness estimated in S130 and the virtual tire damping control gain determined in S140. The required damping force may be determined in proportion to the relative speed between the wheel and the road surface input.

In S170, the controller 300 may determine the final required damping force for each corner by integrating the skyhook required damping force (damping force) for each vehicle body corner, the virtual tire damping required damping force, and the passive required damping force determined in S140. The controller 300 may determine the passive damping force based on the passive damping control gain determined in S140, the vehicle body vertical speed, and the wheel vertical speed.

In S180, the controller 300 may generate a current signal which is actually applied to the variable damper 200 based on the final required damping force for each corner and the damper feature. The controller 300 may determine the amount of current to be applied to the solenoid valve of the variable damper 200 in consideration of the final required damping force for each corner and the feature of the variable damper 200. The controller 300 may generate the current signal based on the determined amount of current and apply it to the solenoid valve. Furthermore, the controller 300 may limit the upper and lower limits of the current signal in consideration of an actuator (e.g., a solenoid valve) load and the minimum driving current.

According to the above embodiments, it is possible to improve the tire road holding (minimizing of tire vertical force fluctuation) performance by performing a control for minimizing the relative speed between the wheel and the road surface. As tire road holding performance is improved, handling performance may be improved, and riding comfort may be improved through skyhook control.

Figure 5:
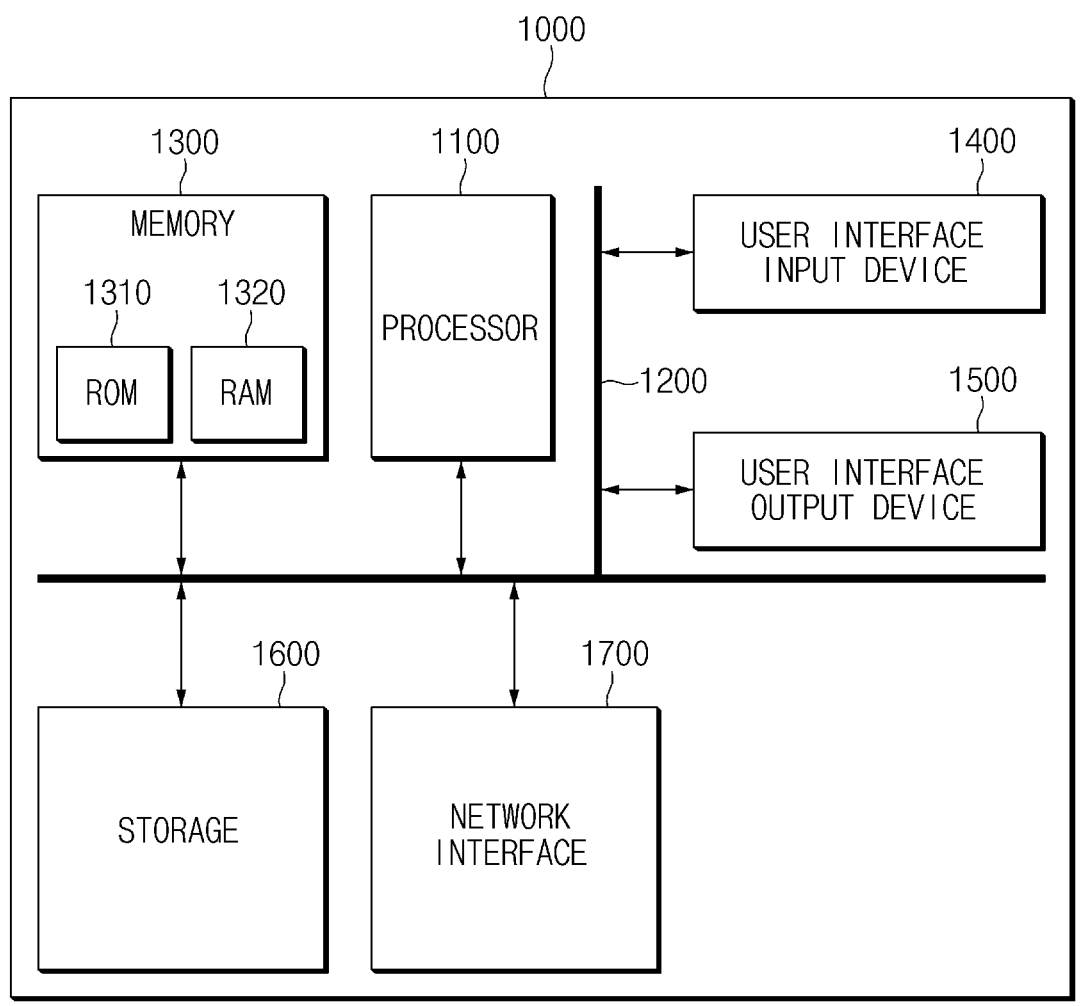
FIG. 5 is a block diagram illustrating a computing system for executing a method of controlling vehicle suspension according to various exemplary embodiments of the present invention.

FIG. 5 is a block diagram illustrating a computing system for executing a method of controlling vehicle suspension according to various exemplary embodiments of the present invention.

Referring to FIG. 5, a computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present invention may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor 1100 and the storage medium may reside in the user terminal as an individual component.

According to various exemplary embodiments of the present invention, because the variable damper is controlled in consideration of virtual tire damping, the relative speed between the wheel and the road surface may be minimized, improving tire road holding (minimizing fluctuations in tire vertical force).

According to various exemplary embodiments of the present invention, when turning, the vehicle yaw rate gain (reactivity-related) increases, but the vehicle side slip angle (stability-related) decreases, so that it is possible to reduce the transient lateral acceleration and yaw rate overshoot ratio (stability and grip performance).

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling vehicle suspension, the apparatus comprising:
   a variable damper mounted between a vehicle body and a wheel of a vehicle;
   first acceleration sensors mounted at each corner of the vehicle body and configured to measure a vehicle body corner vertical acceleration;
   second acceleration sensors mounted to each wheel of the vehicle and configured to measure a wheel vertical acceleration; and
   a controller engaged to the first acceleration sensors and the second acceleration sensors and configured to estimate a road surface roughness according to the vehicle body corner vertical acceleration and the wheel vertical acceleration, to determine a virtual tire damping required damping force according to the estimated road surface roughness, and to adjust a damping force of the variable damper according to the determined virtual tire damping required damping force.

2. The apparatus of claim 1, wherein the controller is configured to remove noise from measured signals output from the first acceleration sensors and the second acceleration sensors through filtering the noise from the measured signals and to obtain a vehicle body corner vertical speed and a wheel vertical speed through integration.

3. The apparatus of claim 2, wherein the controller is configured to determine a skyhook control gain, a virtual tire damping control gain and a passive required damping force according to the road surface roughness and vehicle driving information obtained through a controller area network (CAN).

4. The apparatus of claim 3, wherein the controller is configured to determine a vertical speed, a pitch angular speed and a roll angular speed of a vehicle body gravity center according to the vehicle body corner vertical speed and the wheel vertical speed, to determine a skyhook control required force and a moment according to the vertical speed, the pitch angular speed and the roll angular speed of the vehicle body gravity center, and to allocate a required damping force for each vehicle body corner according to the skyhook control required force and the moment.

5. The apparatus of claim 4, wherein the controller is configured to determine the virtual tire damping required damping force by use of the road surface roughness and the virtual tire damping control gain.

6. The apparatus of claim 5, wherein the controller is configured to determine a final required damping force of each corner by integrating the required damping force of each vehicle body corner, the virtual tire damping required damping force and the passive required damping force.

7. The apparatus of claim 6, wherein the controller is configured to determine a current to be applied to the variable damper according to the final required damping force of each corner.

8. The apparatus of claim 1, wherein the controller is configured to estimate the road surface roughness by use of a Kalman filter.

9. The apparatus of claim 1, wherein the controller is configured to control the damping force of the variable damper by adjusting a current signal applied to a solenoid valve of the variable damper.

10. A method of controlling vehicle suspension, the method comprising
measuring a vehicle body corner vertical acceleration and a wheel vertical acceleration through first acceleration sensors and second acceleration sensors that are mounted on a vehicle body and a wheel of a vehicle, respectively;
estimating, by a controller, a road surface roughness according to the vehicle body corner vertical acceleration and the wheel vertical acceleration;
determining, by the controller, a virtual tire damping required damping force according to the road surface roughness; and
adjusting, by the controller, a damping force of a variable damper according to the virtual tire damping required damping force.

11. The method of claim 10, wherein the measuring the vehicle body corner vertical acceleration and the wheel vertical acceleration includes:
removing noise from measured signals output from the first acceleration sensors and the second acceleration sensors through filtering the noise from the measured signals and obtaining a vehicle body corner vertical speed and a wheel vertical speed through integration.

12. The method of claim 11, wherein the estimating of the road surface roughness includes:
obtaining vehicle driving information through a controller area network (CAN); and
determining a skyhook control gain, a virtual tire damping control gain and a passive required damping force according to the vehicle driving information and the road surface roughness.

13. The method of claim 12, further including:
determining, by the controller, a vertical speed, a pitch angular speed and a roll angular speed of a vehicle body gravity center according to the vehicle body corner vertical speed and the wheel vertical speed,
determining, by the controller, a skyhook control required force and a moment according to the vertical speed, the pitch angular speed and the roll angular speed of the vehicle body gravity center and the skyhook control gain, and
allocating, by the controller, a required damping force of each vehicle body corner according to the skyhook control required force and the moment.

14. The method of claim 13, wherein the determining of the virtual tire damping required damping force includes:
determining the virtual tire damping required damping force by use of the road surface roughness and the virtual tire damping control gain.

15. The method of claim 14, wherein the adjusting of the damping force of the variable damper includes:
determining a final required damping force of each corner by integrating the required damping force of each vehicle body corner, the virtual tire damping required damping force and the passive required damping force.

16. The method of claim 15, wherein the adjusting of the damping force of the variable damper includes:
determining a current to be applied to the variable damper according to the final required damping force of each corner.

17. The method of claim 10, wherein the adjusting of the damping force of the variable damper further includes:
controlling the damping force of the variable damper by adjusting a current signal applied to a solenoid valve of the variable damper.

18. The method of claim 10, wherein the controller includes:
a processor; and
a non-transitory storage medium on which a program for performing the method of claim 10 is recorded and executed by the processor.

* * * * *